United States Patent [19]

Bartholomew

[11] Patent Number: 5,232,252
[45] Date of Patent: Aug. 3, 1993

[54] ADAPTIVE CONNECTOR ASSEMBLY

[75] Inventor: Donald D. Bartholomew, Mt. Clemens, Mich.

[73] Assignee: Proprietary Technology, Inc., Southfield, Mich.

[21] Appl. No.: 769,598

[22] Filed: Oct. 1, 1991

Related U.S. Application Data

[63] Continuation-in-part of Ser. No. 405,758, Sep. 11, 1989, Pat. No. 5,052,723.

[51] Int. Cl.⁵ .............................................. F16L 17/03
[52] U.S. Cl. .................................... 285/108; 285/111; 285/379; 285/224
[58] Field of Search ............... 285/108, 110, 111, 379, 285/224

[56] References Cited

U.S. PATENT DOCUMENTS

| | | | |
|---|---|---|---|
| 1,117,961 | 11/1914 | Phillips | 285/108 X |
| 2,251,651 | 8/1941 | Ames et al. | 285/108 X |
| 4,838,582 | 6/1989 | Hatakeyama et al. | 285/110 |

FOREIGN PATENT DOCUMENTS

| | | | |
|---|---|---|---|
| 1160248 | 12/1963 | Fed. Rep. of Germany | 285/110 |
| 1288994 | 2/1964 | Fed. Rep. of Germany | 285/110 |
| 1267919 | 5/1968 | Fed. Rep. of Germany | 265/110 |
| 381934 | 11/1964 | Switzerland | 285/110 |

*Primary Examiner*—Dave W. Arola
*Attorney, Agent, or Firm*—Harness, Dickey & Pierce

[57] ABSTRACT

The present invention relates to an accommodating sealing sleeve which allows for the off-axis connection of two conduits. The accommodating sealing sleeve is generally comprised of an annular housing and various internal components. The internal components include an adaptive seal, an adaptive seal retainer, a bushing and a garter spring. A conduit is inserted through the housing, adaptive seal retainer and adaptive seal to become locked in. The adaptive seal is flexible to accommodate the off-axis entry of the conduit into the accommodating sealing sleeve.

9 Claims, 2 Drawing Sheets

ADAPTIVE CONNECTOR ASSEMBLY

CROSS REFERENCE TO A RELATED APPLICATION

This application is a continuation-in-part of co-pending U.S. patent application Ser. No. 07/405,758 filed Sep. 11, 1989 entitled "Locking Accommodating Sealing Port", now U.S. Pat. No. 5,052,723 issued Oct. 1, 1991. The disclosure of this co-pending application is hereby incorporated by reference.

BACKGROUND OF THE INVENTION

1. Field of the Invention

The present invention relates in general to connector assemblies, and more particularly, to adaptive connector assemblies which are capable of connecting two conduits which are "off-axis".

2. Description of Related Art

There are a number of piping systems that use reinforced rubber hoses to join the ends of pipe or pipes to short nipples that are affixed to some device which must be connected to the piping system. Rubber hoses and hose clamps used to secure the hose on the piping system have been in use for many years.

In situations where two devices are to be "connected", and there is a relative movement between the devices, use of a flexible hose to join the two devices makes practical sense.

However, there is another situation where the two devices do not move relative to each other, but hoses, clamps and sometimes pipe links are used to join those devices. In this situation, a hose is used because of the difficulty of making a pipe that routes between two devices which can meet the connection requirements at the joining points. Disclosed herein is an "accommodating sealing sleeve" that will replace the hoses and claims because it will lock onto the end of a standard nose nipple. The accommodating sealing sleeve provides a seal and accommodation for variations in the joining pipes which made the hose and hose clamps necessary in the past.

This accommodating sealing sleeve also conveys some important advantages to the manufacturer of engines or equipment that would use such accommodating sealing sleeves. Due to the confined nature of automobile engines, there is often very little room to replace hoses and tighten clamps. Difficult to reach areas tend to result in many problems, such as wrongly locating the clamp or improperly torquing the clamp, and thus tend to result in increased manufacturing and service costs.

There is also a relatively large time requirement to "make" a proper joint. When an accommodating sealing sleeve is shipped on the pipe ready to be installed, the accommodating sealing sleeve is slid back on the pipe. To make the connection it is only necessary to position the pipe and slide the sleeve onto the mating hose nipple until the nipple's bead passes by the adaptive seal lead-in portion. When the nipple is aligned within the sealing sleeve at a certain point, a lot more force is required to slide the accommodating sealing sleeve further off of the pipe and onto the nipple. This in turn informs the operator that the accommodating sealing sleeve is in the proper position. Generally, this sliding connection is much faster than installing a length of hose and clamping the hose onto the nipple.

If replacement of an accommodating sealing sleeve is necessary, the user also has the option of replacing the old sealing sleeve with a new sealing sleeve or sliding the old sealing sleeve back onto the piping system and attaching a hose and clamps. This facilitates replacement of the parts in the field.

The figures show an embodiment of the adaptive pipe connection which tends to have low tooling costs for a large variety of sizes and a means of obtaining a very large (relative to industry practice) accommodation of co-axial mis-match and off-axis alignment of the pipe and nipple ends.

It is the primary object of the present invention to provide an accommodating sealing sleeve which allows for sealing one end of a pipe to a nipple even if the connection is somewhat off axis.

It is yet another object of the present invention to provide an accommodating sealing sleeve which selectively locks the pipe to the nipple.

It is yet another object of the present invention to provide an accommodating sealing sleeve which is ready to be installed and gives rise to quick "field" repairs.

SUMMARY OF THE INVENTION

To achieve the foregoing objects, the present invention provides an accommodating sealing sleeve assembly which generally comprises a housing, flexible sealing means, retaining means and means for maintaining the position of the sealing means against the retaining means. A nipple having a beaded end portion is inserted into the housing through an axial bore. The sealing means which are disposed within the housing is provided with an annular channel through which the nipple passes during the connection process. The annular channel is tapered slightly so that the bead is required to expand the annular channel prior to being locked within the accommodating sealing sleeve. Substantial insertion force is applied causing the annular bead to momentarily expand the annular channel allowing the bead past the portion of the annular channel having the smallest diameter. When the nipple is fully inserted and locked in place, the inner diameter of the annular channel abuts the outer surface of the nipple to provide sealing means. A circumferential spring tightens the annular channel over the nipple's outer diameter. The retaining means has a circumferential lip which is adapted to be disposed generally within the axial opening of the annular channel. The front surface of the retaining means circumferential ring abuts the housing. With the nipple locked in the accommodating sealing sleeve and the annular channel of the adaptive seal abutting the nipple, the annular channel can be rotated off axis and still maintain a fluid connection between the adaptive connector and the nipple.

Additional objects and advantages of the present invention will become apparent from a reading of the detailed description of the preferred embodiments which make reference to the following set of drawings in which:

BRIEF DESCRIPTION OF PREFERRED EMBODIMENTS

DETAILED DESCRIPTION OF THE PREFERRED EMBODIMENT

Figure 1:
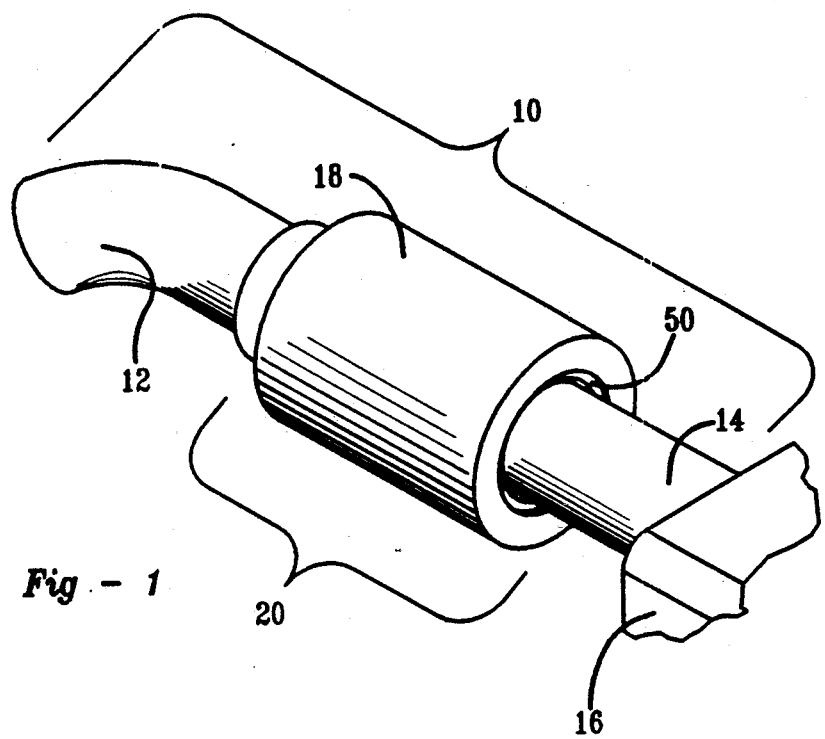
FIG. 1 is a perspective view showing a portion of the piping system adaptively connected to a nipple by the accommodating sealing sleeve of the present invention.

Referring to FIG. 1, a perspective view of a portion of the piping system 12 adaptively connected to a nipple 14 which extends from device 16 by an accommodating sealing sleeve assembly 20 is disclosed. The combination 10 also shows the outer housing 18 of the sealing sleeve assembly 20 and the adaptive seal retainer 50. The front surface 51 of adaptive seal retainer 50 is contiguous against the front wall (shown in FIG. 2) of housing 18.

Figure 2:
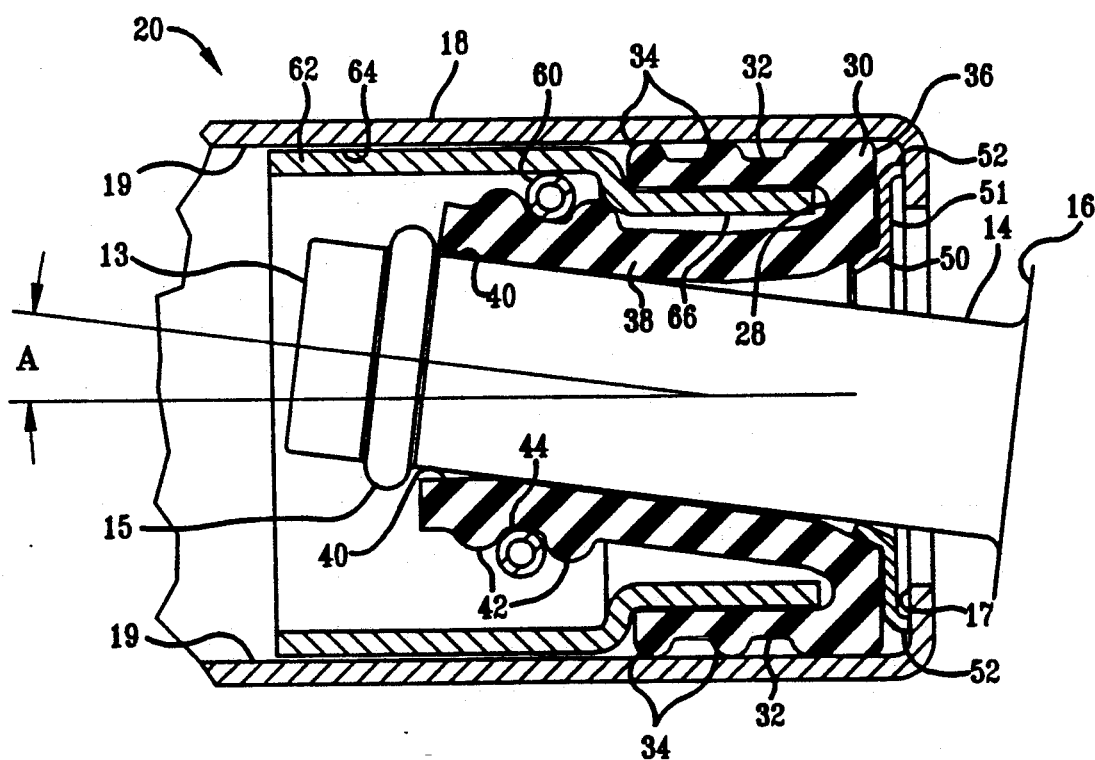
FIG. 2 is a partial cross-sectional view of the adaptive pipe connector assembly of FIG. 1 connected by the accommodating sealing sleeve to the nipple which is at a large off-axis angle relative to the housing.

Referring to FIG. 2, shown is a partial cross-sectional view of the adaptive pipe connector assembly of FIG. 1 connected by the accommodating sealing sleeve to the nipple 14 which is at an off-axis angle relative to the housing 18. The nipple 14 has an annular bead 15 located proximate to the nipple end 13. The internal components of the accommodating sealing sleeve assembly 20 include an adaptive seal 30, an adaptive seal retainer 50, bushing 62 and a "garter" spring 60. It will be understood that while only the end of the accommodating sealing sleeve assembly 20 that connects to the nipple 14 is shown, the opposite end which is connected to the piping system 12 is comprised of the same or similar components.

The adaptive seal 30 has an annular ring 32 which extends perpendicularly from the back of the adaptive seal face 36. This annular ring 32 includes a number of circumferential projections 34 which abut the inner surface 19 of housing 18. Also extending from the back of the adaptive seal face 36 is an annular channel 38 which is slightly tapered toward the center of the accommodating sealing sleeve 20 from the axial opening 31. The end 40 of annular channel 38 is tapered toward the axial opening 31 from the center of the accommodating sealing sleeve 20 to facilitate the removal of nipple 14 from the accommodating sealing sleeve 20. The axial opening of annular channel 38 is greater than the circumference of nipple 14 which allows for the off-axis entry of the nipple 14 into the adaptive seal 30. The annular channel 38 of adaptive seal 30 has a pair of annular nubs 42 and a recessed portion 44 which hosts a "garter" spring 60. This adaptive seal 30 is formed of a flexible elastomer which allows the annular channel 38 to be rotated off axis as designated by the letter A if FIG. 2, while the rest of the adaptive seal 30 remains axially aligned by bushing 62 and adaptive seal retainer 50. Flexing occurs at point 29 of the annular channel 38 to accommodate off-axis entry of nipple 14 into adaptive seal 30.

The bushing 62 has an outer annular surface 62 which is substantially contiguous with the inner surface 19 of housing 18. Bushing 62 also has a second annular surface 66 which has a reduced circumference relative to the annular surface 62. This second annular surface 66 extends into the pocket 28 formed between the annular ring 32 and annular channel 38 of the adaptive seal 30. Bushing 62 may be formed from a hard plastic or metal, such as stainless steel.

Adaptive seal retainer 50 includes a circumferential ring 52 having an aperture 53 therethrough. The front surface 51 of the circumferential ring 52 abuts the side end wall 17 of housing 18. Extending from the back surface of circumferential ring 52 is an extending lip 54 around aperture 53 which engages the inner surface of annular ring member 38 at the point where the annular ring member 38 projects from the adaptive seal 30. This aperture 53 is greater in circumference than the circumference of nipple 14 which allows for an off-axis entry. Typically, the adaptive seal retainer is formed from stainless steel because of its durability. The bushing 62 and adaptive seal retainer cooperatively secure the adaptive seal 30 within accommodating sealing sleeve 20.

Figure 3:
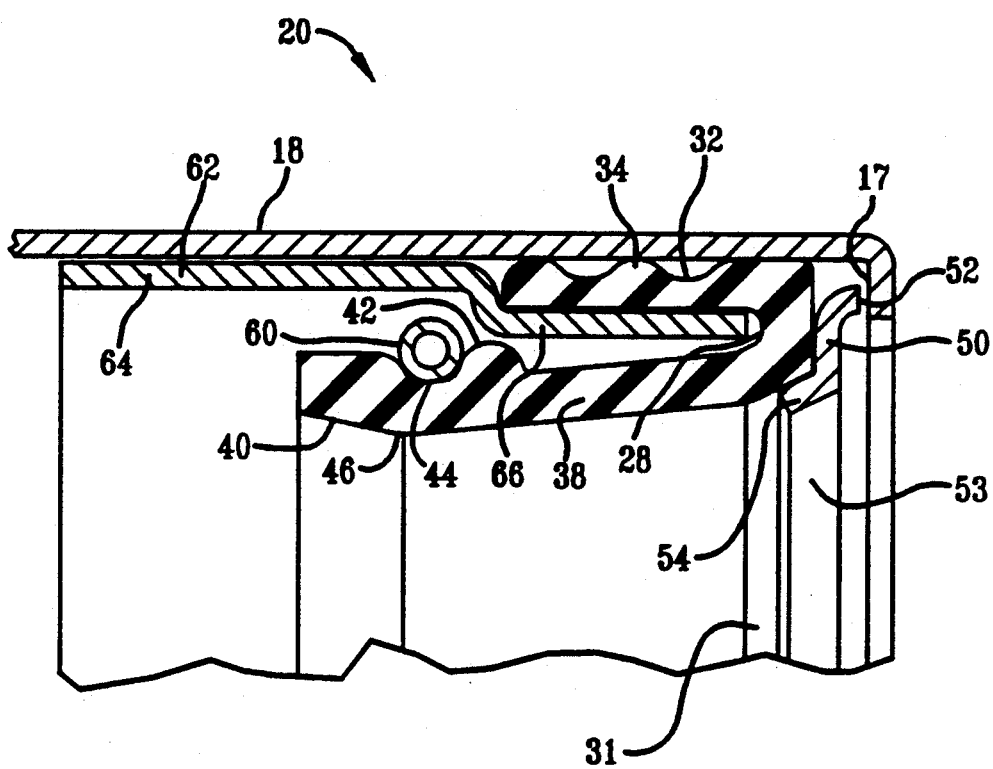
FIG. 3 is a partial cross-sectional view of the accommodating sealing sleeve of FIG. 1 shown in the disconnected position.

Referring to FIG. 3, the accommodating sealing sleeve 20 is shown in partial cross-section in the unengaged position. As noted previously, the annular ring 38 of the adaptive seal 30 is slightly tapered toward the center of the accommodating sealing sleeve 20. Generally this tapering is about a six degree angle. The end 40 is also tapered so that the annular bead 15 of nipple 14 must expand the adaptive seal 30 and pass by point 46 in order to "lock" the nipple within the accommodating sealing sleeve 20. The tapering of end portion 40 generally has about a forty five degree angle. This tapered end 40 also serves to provide a stabilizing force against the bead 15 of nipple 14 when the nipple 14 is fully inserted into adaptive seal 30.

Prior to connecting the accommodating sealing sleeve 20 to the nipple 14, the sleeve 20 is often initially positioned entirely on the pipe 12. Pipe 12 is then positioned in a location which allows pipe 12 to be connected to nipple 14 via the sleeve 20. Sleeve 20 is slid off of pipe 12 in the direction of the nipple 14 until the annular ring 38 makes this onward movement more difficult. This increased insertion force requirement assures the operator that the nipple is properly positioned within the sealing sleeve 20. With the application of extra force, the annular bead 15 of nipple 14 causes the adaptive seal 30 to expand at point 46 until the bead 15 slides past point 46 into the tapered end portion 40 of adaptive seal 30. The sleeve 20 is now locked onto the nipple 14. Garter spring 60, which expands as the adaptive seal expands, recoils once the bead 15 has passed by point 46 pulling the annular ring 38 at point 46 into tight contact with nipple 14.

The accommodating sealing sleeve 20 can be uncoupled from nipple 14 by the operator by pulling the accommodating sealing sleeve 20 away from the nipple 14 with somewhat more force than was required to install the sealing sleeve 20 over the nipple 14. The operator grasps the housing 18 of sealing sleeve 20 and pulls it back in the direction of the pipe 12. The bead 15 of nipple 14 engages the tapered end 40 and then bead 15 expands adaptive seal 30 at point 46. Spring 60 expands as point 46 expands, thereby allowing the nipple 14 to be withdrawn from adaptive seal 30.

Suitable materials for adaptive seal 30 would be an appropriate elastomer which is resistent to the media confined by system 10. As can be seen from FIG. 2, the annular ring 38 of adaptive seal 30 is flexible at point 29 giving adaptive seal 30 the ability to accommodate off-axis positioning of the nipple 14. Accommodation of the off-axis conditions is a major reason that hoses and clamps have been used to join pipes and nipples for so many years. The advantages of very rapid and reliable attachment and reattachment, using the accommodating sealing sleeve 20 that is capable of accommodating the usual fabrication tolerances, will be immediately recognized by those who use the present methods of attachment. Those who use the present hose and clamp method of making the off-axis attachments tend to be concerned with field repairable of these connections. As noted in the disclosure objectives, the accommodating sealing sleeve 20 is readily field repairable which is an important consideration.

The present concept involves finding a way of using standard flexible hose nipple ends that employ a beaded end where the sealing is accomplished behind the abutting area rather than in front of the abutting area as is typically the case with quick type connectors. With the present invention, reattachment of the pipe 12 and nipple 14 can still be accomplished by replacing the accommodating sealing sleeve 20 with hose and clamps once the accommodating sealing sleeve 20 has been slid back onto the pipe 12.

It is noted that although hose clamps have a larger compressive "footprint" in general than would be commonly used with the disclosed embodiment, the distortion stress exposed on the adaptive sealing 30 are much lower than those imposed by the hose clamps on a hose, because the hose clamp must also give rise to the compressive squeeze force responsible for sealing and retaining.

While it will be apparent that the preferred embodiment of the invention disclosed are well calculated to provide the advantages above stated, it will be appreciated that the invention is susceptible to modification, variation and change without department from the proper scope or fair meaning of the subjoined claims.

What is claimed:

1. A connector sleeve, comprising:
   an annular housing;
   sealing means for sealing a conduit with an annular bead in said annular housing, said sealing means positioned in said housing and including an axial opening enabling passage of said conduit through said sealing means and said sealing means including an annular channel having a circumferential spring located thereupon for urging said sealing means against said conduit to seal and retain said conduit when said annular bead of said conduit is in a position inward of said circumferential sealing spring;
   retaining means for aligning said sealing means within said housing, said retaining means extending into said annular channel of said sealing means; and
   means for maintaining the position of said sealing means against said retaining means.

2. The connector sleeve according to claim 1, wherein said sealing means includes an annular ring for maintaining said sealing means against said annular housing and a tapering annular channel for sealing said conduit, said tapering annular channel having an annular groove for hosting said circumferential spring.

3. The connector sleeve according to claim 1, wherein said annular channel has first and second downwardly tapering positions.

4. The connector sleeve according to claim 3, wherein said first downwardly tapering portion has a taper of approximately six degrees.

5. The connector sleeve according to claim 3, wherein said second tapering portion has a taper of approximately forty-five degrees.

6. The connector sleeve according to claim 3, wherein said annular channel is relatively flexible to accommodate an off-axis entry of said conduit.

7. The connector sleeve according to claim 1, wherein said retaining means includes a circumferential ring having an aperture therethrough enabling passage of said conduit and an annular lip projecting from said circumferential ring, said annular lip extending into said sealing means axial opening.

8. The connector assembly according to claim 1, wherein said means for maintaining the position of said sealing means against said retaining means is a bushing member, said bushing member further comprising a first annular surface which is substantially contiguous with said annular housing and a second annular surface which is substantially contiguous with said annular ring.

9. The connector assembly according to claim 8, wherein said bushing limits axial displacement of said annular channel.

* * * * *